(12) United States Patent
Mordukhovich

(10) Patent No.: US 7,028,823 B2
(45) Date of Patent: *Apr. 18, 2006

(54) WOVEN COMPOSITE CLUTCH FRICTION MEMBER WITH DUAL-DIRECTIONAL MODULI OF ELASTICITY

(75) Inventor: Gregory Mordukhovich, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 59 days.

This patent is subject to a terminal disclaimer.

(21) Appl. No.: 10/833,910

(22) Filed: Apr. 28, 2004

(65) Prior Publication Data

US 2005/0241907 A1    Nov. 3, 2005

(51) Int. Cl.
*F16D 69/00*    (2006.01)
(52) U.S. Cl. .............................. 192/107 M; 192/113.34
(58) Field of Classification Search ..................... None
See application file for complete search history.

(56) References Cited

U.S. PATENT DOCUMENTS

| | | | | |
|---|---|---|---|---|
| 3,520,390 A | * | 7/1970 | Bentz | 192/107 R |
| 4,291,794 A | * | 9/1981 | Bauer | 192/107 M |
| 4,318,955 A | * | 3/1982 | Kulakov et al. | 442/242 |
| 4,997,067 A | * | 3/1991 | Watts | 188/251 A |
| 5,096,661 A | | 3/1992 | Lang | 419/2 |
| 5,615,758 A | | 4/1997 | Nels | 192/113.26 |
| 5,662,993 A | | 9/1997 | Winckler | 442/101 |
| 5,842,551 A | | 12/1998 | Nels | 192/107 |
| 6,132,877 A | | 10/2000 | Winckler et al. | 428/408 |
| 2003/0012940 A1 | | 1/2003 | Bowles et al. | 428/297.4 |
| 2005/0077139 A1 | * | 4/2005 | Mordukhovich | 192/107 M |

* cited by examiner

*Primary Examiner*—Richard M. Lorence
(74) *Attorney, Agent, or Firm*—Christopher DeVries

(57) ABSTRACT

A friction member for engagement in a torque-transmitting mechanism includes a first material and a second material. The first and second materials are woven together to provide a friction surface. The friction member is characterized by a first modulus of elasticity in a first direction with respect to the friction surface and a second modulus of elasticity in a second direction with respect to the friction surface. The second modulus of elasticity is greater than the first modulus of elasticity.

20 Claims, 2 Drawing Sheets

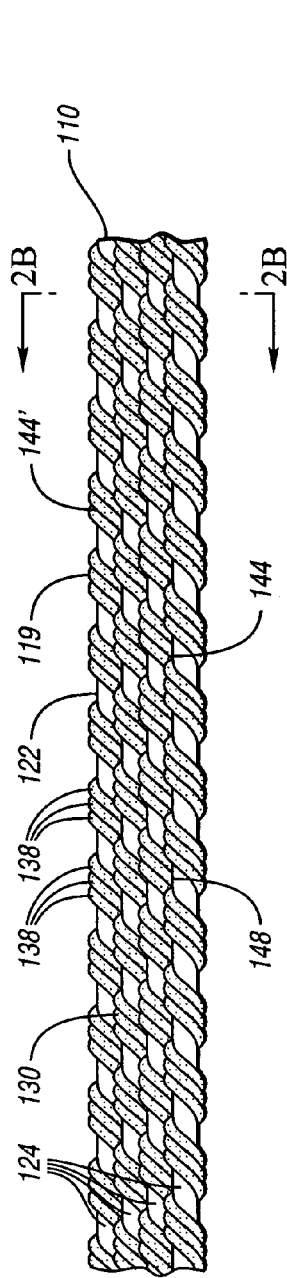
FIG. 2A
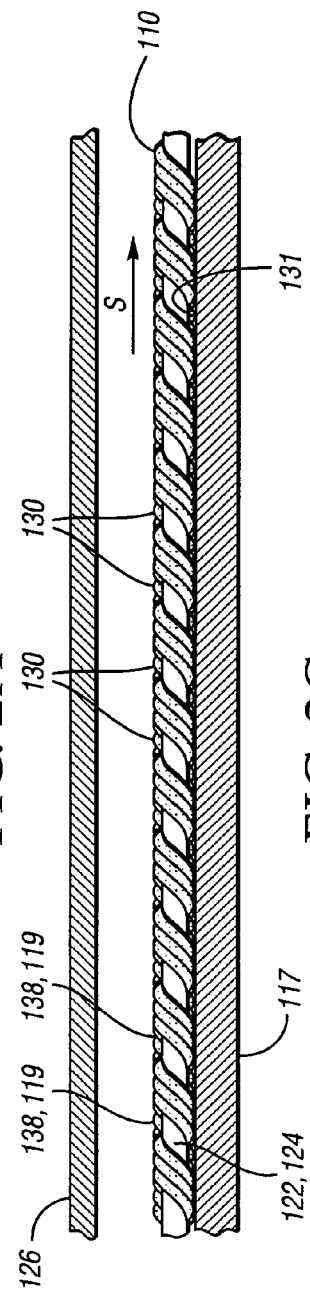
FIG. 2C
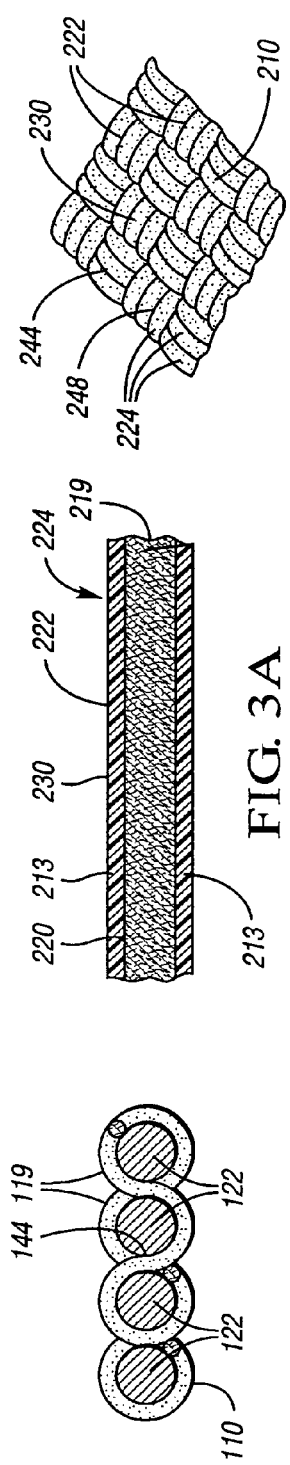
FIG. 3A
FIG. 3B
FIG. 2B

WOVEN COMPOSITE CLUTCH FRICTION MEMBER WITH DUAL-DIRECTIONAL MODULI OF ELASTICITY

TECHNICAL FIELD

This invention relates to a friction clutch member for use in a wet clutch application.

BACKGROUND OF THE INVENTION

A vehicle engine is traditionally coupled with a transmission for transmitting torque to the wheels via a torque converter. A wet friction interface may be used with the torque converter for establishing torque transfer under a slip condition (i.e., relative rotation of opposing surfaces forming the friction interface). U.S. Pat. No. 6,132,877, issued Oct. 17, 2000 to Winckler et al, assigned to General Motors Corporation, and hereby incorporated by reference in its entirety, describes a friction interface composed of a high density, low porosity, carbon composite material, infiltrated with chemical vapor deposited carbon and, preferably, having a substrate of a satin weave fabric. Another application of a friction interface used in a torque converter is described in U.S. Pat. No. 5,195,621, issued Mar. 23, 1993 to Dull et al, assigned to General Motors Corporation, and hereby incorporated by reference in its entirety. The use of friction material having a heat resistant paper support bearing resin-bonded carbon particles is known in the art, as described in U.S. Pat. No. 5,083,650, issued Jan. 28, 1992 to Seiz et al, assigned to Minnesota Mining and Manufacturing Company and to General Motors Corporation, which is hereby incorporated by reference in its entirety.

Additionally, a wet clutch with a friction interface may be used in lieu of a torque converter for vehicle launch with slip, especially on vehicles designed with a wider overall speed ratio, as the ratio-boosting affect of the torque converter may not be necessary in such an application.

SUMMARY OF THE INVENTION

Accordingly, a friction member for engagement in a torque-transmitting mechanism includes a first material and a second material. The first and second materials are woven together to provide a friction surface. The friction member is characterized by a first modulus of elasticity in a first direction with respect to the friction surface. The friction member is further characterized by a second modulus of elasticity in a second direction with respect to the friction surface. Preferably, the first direction is substantially normal to the sliding contact and the second direction is substantially parallel to the sliding contact. The second modulus of elasticity is greater than the first modulus of elasticity. A friction member having dual-directional moduli of elasticity is discussed in U.S. Provisional Application No. 60/509,589, filed Oct. 8, 2003, which is hereby incorporated by reference in its entirety.

In another aspect of the invention, the friction surface is operable for sliding contact with an opposing reaction member in the torque-transmitting mechanism. As used herein, and as will be readily understood by those of ordinary skill in the art, "sliding contact" means that there is relative sliding movement (i.e., slip) between the friction member and the reaction member; preferably, during "sliding contact", the friction surface and reaction member are generally separated from direct physical contact with one another by a layer of lubricant disposed therebetween. The sliding contact is characterized by a coefficient of friction. The first direction is substantially normal to the sliding contact and the second direction is substantially parallel to the sliding contact. The first and second moduli of elasticity cooperate to at least partially establish the coefficient of friction and control vibrational shudder of the torque-transmitting mechanism resulting from the sliding contact.

In another aspect of the invention, the woven friction member forms first and second channels operable for transporting lubricant through the friction member in substantially the first and second directions. The friction member is characterized by an inner diameter and an outer diameter, respectively. The channels are operable for transporting lubricant from one of the inner diameter and outer diameter.

In another aspect of the invention, the woven friction member forms channels disposed in the first direction for transporting lubricant through the friction member in the first direction. The first modulus of elasticity is at least partially affected by lubricant transport through the channels. The transporting of lubricant through the channels at least partially increases the coefficient of friction.

In yet another aspect of the invention, the woven friction member forms channels disposed in the second direction for transporting lubricant through the friction member in the second direction. The second modulus of elasticity is at least partially affected by lubricant transport through the channels. The transporting of lubricant through the channels at least partially decreases vibrational shudder of the torque-transmitting mechanism.

In yet another aspect of the invention, the first and second materials are woven such that the friction surface is substantially formed by the second material. The first material is disposed substantially away from the friction surface.

In a further aspect of the invention, the first material is characterized by generally elongated first strands. The first strands are disposed generally parallel to one another and to the sliding contact. The second material is characterized by generally elongated second strands. The second strands are woven with the first strands such that that the second strands form the friction surface. The friction surface is disposed between the reaction member and the first strands such that the sliding contact occurs with the second strands.

In another aspect of the invention, the first material includes fibers comprising poly-paraphenylene terephthalamide, marketed by DuPont under the trademark KEVLAR®.

In another aspect of the invention, the second material includes carbon-based fibers.

In yet another aspect of the invention, the first material includes a coating adhered to the second material. In this instance, the first material may be a resin.

A power transmission includes a torque-transmitting mechanism. The torque-transmitting mechanism includes a friction member and an opposing reaction member. The friction member and reaction member are selectively engageable for transmitting power. The friction member has a friction surface for sliding contact with the reaction member. The sliding contact is characterized by a coefficient of friction. The sliding contacts acts to engage a torque-transmitting mechanism. The friction member has a first material and a second material. The first and second materials are woven. The friction material is characterized by a first modulus of elasticity in the first direction substantially normal to the sliding contact and by a second modulus of elasticity in a second direction substantially parallel to the sliding contact. The second modulus of elasticity is greater than the first modulus of elasticity.

The above features and advantages, and other features and advantages, of the present invention are readily apparent from the following detailed description of the best mode for carrying out the invention when taken in connection with the accompanying drawings.

BRIEF DESCRIPTION OF THE DRAWINGS

FIG. 2A is a schematic plan view of a friction member woven from a first material and a second material forming a friction surface;

FIG. 2B is a schematic cross-sectional view of the friction member of FIG. 2A taken at the arrows shown in FIG. 2A;

FIG. 2C is a schematic elevational view of the friction member of FIGS. 2A and 2B disposed between a clutch member and a reaction member;

FIG. 3A is a schematic cross-sectional view of a second embodiment of a friction member within the scope of the invention; and FIG. 3B is a schematic plan view of the friction member of FIG. 3A.

DESCRIPTION OF THE PREFERRED EMBODIMENTS

Figure 1:
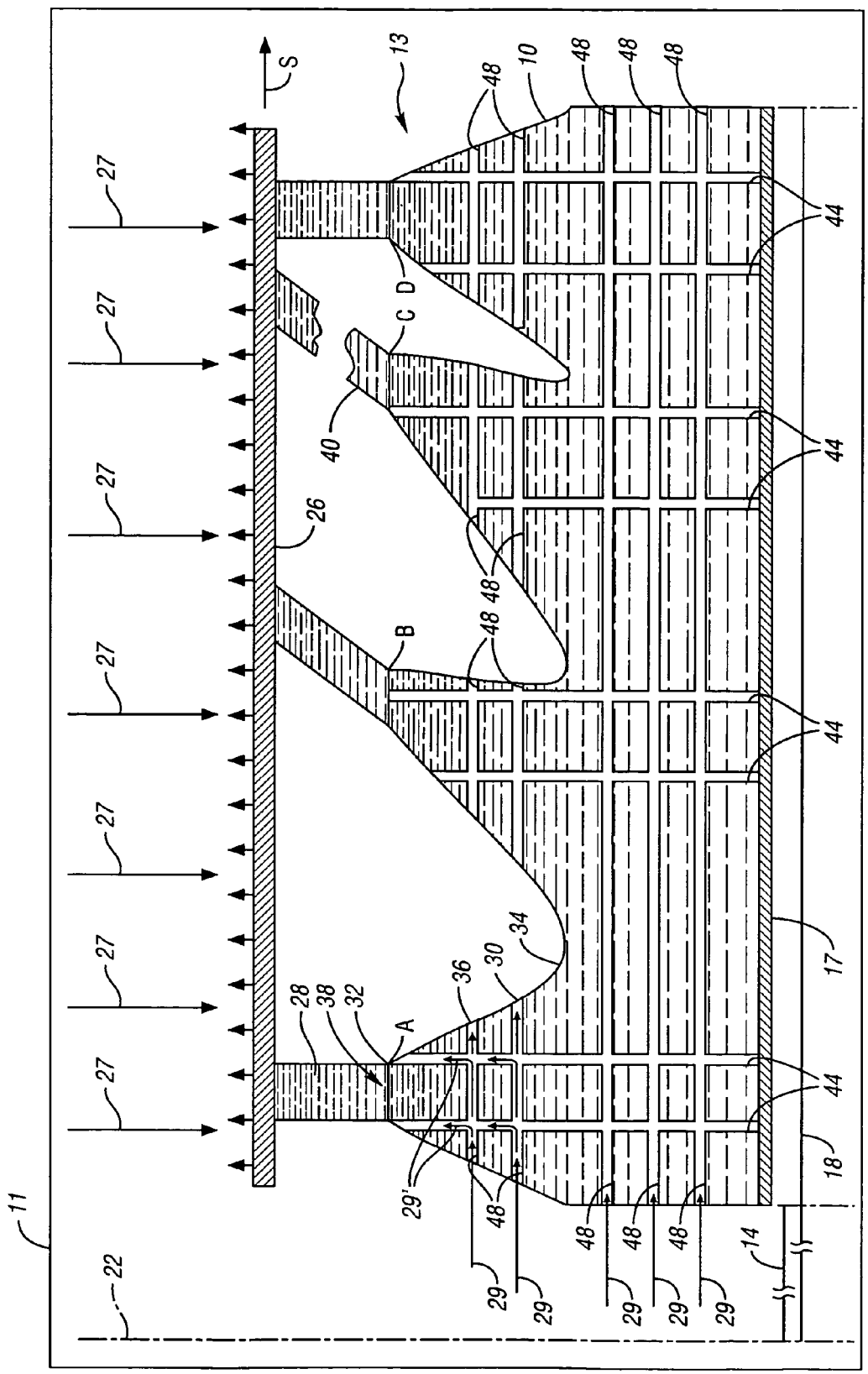
FIG. 1 is a schematic cross-sectional view of a friction member in sliding contact with a reaction member, in accordance with the invention.

Referring to FIG. 1, a schematic radial cross section of a friction member (i.e., clutch plate) 10 for a transmission 11 is depicted. Preferably, the friction member 10 is an annular ring with an inner radius 14 and an outer radius 18 measured from a center axis of rotation 22. (A corresponding inner diameter and outer diameter are associated with the inner radius 14, and outer radius 18, respectively.) The material from which the friction member is formed has a modulus of elasticity E. The friction member 10 is connected to a clutch plate 17 using adhesives or other attachment mechanisms. The friction member 10 opposes a reaction member or reaction plate 26. The friction member 10 and reaction plate 26 are included in torque-transmitting mechanism 13, which may be a clutch within a torque converter included in the transmission 11. Alternatively, the torque-transmitting mechanism 13 may be a friction interface of a rotating clutch or stationary clutch (i.e., a brake). Preferably, the reaction plate 26 is also an annular ring with a like inner and outer radius. Transmission fluid, also referred to as lubricant or oil, is disposed in the transmission. Some of the fluid forms a column of oil 28 disposed between the reaction plate 26 and the friction member 10, as depicted in FIG. 1, such that engagement of the friction member 10 and the reaction plate 26 is a "wet clutch" application.

At a microscopic level, the friction member 10 is porous with an uneven, irregular surface 30. The elevational difference between a selected peak (high portion) 32 and valley (low portion) 34 forms a peaked portion 36. (The friction member 10 has a multitude of peaked portions of various heights, only one of which is schematically depicted in FIG. 1 at various stages of flex during sliding of the reaction plate 26 relative to the friction member 10.) When applied pressure (denoted by arrows 27) forces the reaction plate 26 and the friction member 10 toward one another, the actual contact area 38 between the plate 26 and the friction member 10 is at the top of the peaked portion 36.

During the elasto-hydrodynamic (EHD) phase of clutch engagement, the column of oil 28 is disposed between the plate 26 and the friction member 10. During engagement, it may be desirable to have a period of slip (i.e., a velocity differential, also referred to as slip speed) between the friction member 10 and the reaction plate 26 to allow for a gradual torque transmission. The coefficient of friction u (i.e., the ratio of resulting tangential force between the friction member 10 and the reaction plate 26 to the applied normal force) may vary with slip speed, as it may be more difficult for the friction member 10 to "grab" to the reaction plate 26 at high slip speeds. It is desirable to maximize the coefficient of friction u at high slip speeds for efficient torque transfer. Generally, a friction member having a low modulus of elasticity in the direction normal to the actual contact area 38 (herein referred to as a first modulus of elasticity $E_1$) will increase the actual contact area 38, thus providing a greater coefficient of friction u than a friction member with a high modulus of elasticity in the normal direction.

The coefficient of friction u is also a function of the oil viscosity and shearability at the actual contact area 38. During frictional engagement, the viscous property of the column of oil 28 in contact with the peaked portion 36 causes the peaked portion 36 to bend or flex in the direction of slide (i.e., slip) between the friction member 10 and the plate 26. The bend or flex of the peaked portion 36 is proportional to its stiffness in the direction of slide (i.e., its modulus of elasticity in the radial direction, also referred to herein as the second modulus of elasticity, $E_2$). The direction of slip or slide is denoted in FIG. 1 by the arrow labeled S. As is schematically depicted in FIG. 1, during slide (i.e., slip), a given peaked portion 36 will bend from an original position A to an intermediate bent position B. At a later time, shear forces will cause the column of oil 28 at the contact area 38 to shear (depicted by sheared oil contact 40); at the shear point, the peaked portion 36, momentarily no longer subject to the viscous force of the column of oil 28, will spring back from a final bent position C to the position D, which is substantially the same as original position A. This spring-back of peaked portions during shear may contribute to vibrational shudder of the transmission. Accordingly, it is desirable to minimize the deformability of the friction member 10 in the direction of slip, thus minimizing shudder. This may be accomplished by providing a relatively high second modulus of elasticity $E_2$ in the direction of slip. The fluid pressure in the friction member 10 may also influence shudder; for instance, a highly pressurized fluid acting on the friction member 10 may increase the modulus of elasticity $E_2$.

Vibrational shudder may be minimized by increasing the modulus of elasticity $E_2$ and/or decreasing the modulus of elasticity $E_1$. Shudder caused by "self excitation" of the friction member 10 may occur if the reaction plate 26 is not flat. During use, a reaction plate that is not flat may have different localized temperatures across it (due to an irregular contact area) causing variations in the height of a typical column of oil 28 between the reaction plate 26 and the friction member 10, thus creating variations in cooling. As discussed below, temperature variations may lead to shudder. Decreasing the modulus of elasticity $E_1$ increases the damping capability of the friction member 10, allowing it to conform to the surface area of the reaction plate 26 (which is typically not perfectly flat), thus minimizing temperature variations.

Vibrational shudder may also occur if the reaction plate 26 and friction member 10 are not parallel upon engagement. Such misalignment will cause a portion of the friction member 10 to contact the reaction plate 26 prior to the remainder of the friction member 10, resulting in pressure variations across the friction member 10. As discussed below, pressure variations cause temperature and oil viscosity variations, which may lead to shudder.

The coefficient of friction, the operational oil viscosity and the shearability of the oil at the contact area are functions of pressure and temperature at the contact area, as well as the pressure differential between the high portion 32 (i.e., the portion of the friction member 10 in contact with the reaction plate 26) and the low portion 34 (i.e., the portion of the friction member 10 out of contact with the reaction plate 26). Temperature is lower at higher pressures. In fact, the actual contact temperature may be up to 300 degrees Celsius, at which temperature the operational viscosity is very sensitive to pressure fluctuations. Accordingly, it follows that operational oil viscosity (which increases with increased pressure) must be kept high at high temperatures in order to minimize or avoid asperity contact. It should be noted that higher slip speeds lead to increased system temperatures. Additionally, the temperature at the contact area may be controlled (i.e., minimized) by one or more of (i) keeping the applied piston pressure low; (ii) increasing the actual contact area; and (iii) controlling the flow of oil past the contact area (permitting cooling thereof) by increasing the clutch oil pressure. With respect to the second alternative above, the actual contact area may be increased by modifying the surface design of the friction member 10. Minimizing temperature at the contact area also leads to a longer useful life of the lubricant, as the rate of depletion of friction modifier additives that may be in the lubricant is decreased at lower temperatures. Additionally, the pressure and temperature at the contact area and the pressure differential are affected by and, therefore, can be controlled by controlling the modulus of elasticity in the normal direction (i.e., the first modulus of elasticity, $E_1$) and the fluid pressure in the porous friction member 10.

The fluid pressure in the friction member 10 is a function of the radial porosity of the member 10, pressure applied to the fluid from a pressure source such as a pump (not shown) and centrifugal forces acting to move fluid radially outward. With increasing clutch pressure, the coefficient of friction is increased at a given slip speed. Additionally, with fluid flow, the fluctuation or spike in the coefficient of friction u (felt as vibrational shudder) as the sliding speed approaches 0.00 m/s (i.e., near completion of clutching, after the slip launch phase) is lessened with respect to that which occurs when there is no fluid flow. The friction coefficient u typically experiences such a spike, causing shudder, near clutch completion. The coefficient of friction often decreases at higher slip speeds.

The friction member 10 is formed with first channels 44 disposed axially, in a first direction substantially normal to the sliding contact between the friction member 10 and the reaction plate 26. The first channels 44 are able to transport fluid to and from the contact area 38. Thus, the first channels 44 affect the temperature and pressure at the contact area as well as the pressure differential between the high portion 32 and low portion 34. The first channels 44 also affect the modulus of elasticity $E_1$ in the first direction. Preferably, the modulus of elasticity $E_1$ is significantly less than the modulus of elasticity E of the friction member 10 formed without the channels 44. Accordingly, the design of the first channels 44 may at least partially establish (e.g., increase) the friction coefficient u of the friction member 10 during engagement.

The friction member 10 is formed with second channels 48 disposed radially, in a second direction substantially parallel to the sliding contact area 38 between the friction member 10 and the reaction plate 26. The second channels 48 increase the porosity of the frictional member 10 in the sliding direction. Preferably, the second channels 48 remain at least partially open, permitting oil flow therethrough, even under loading by normal forces between the friction member 10 and the reaction plate 26. The channels 44 and 48 of FIG. 1 are shown schematically as straight parallel and perpendicular lines for illustrative purposes; however, the channels 44, 48 are likely to be irregular in practice, having sufficient porosity to allow flow in the parallel and perpendicular directions.

Movement of fluid through the member 10 helps to cool the contact area 38 and control the pressure and pressure differentials near the contact area 38 (thereby increasing the coefficient of friction). While radial and normal porosity may contribute to such movement, they may also pressurize and thereby stiffen the friction member 10, increasing the modulus of elasticity in both the first direction (i.e., $E_1$) (which may not be desirable, as discussed above) and the second direction (i.e., $E_2$) (which is desirable, as discussed above). Additionally, centrifugal forces act upon the fluid, moving it radially outward. Thus, an oil supply to the second channels 48 from the inner radius 14 of the friction member 10 (as shown by arrows 29 denoting fluid transport into the channels 48) will work with the centrifugal force whereas an oil supply from the outer radius 18 of the friction member 10 will work against centrifugal force, requiring a greater oil clutch pressure to move the fluid radially inward through the friction member 10. (Arrows 29' denote fluid transport from the channels 48 to the channels 44. Fluid transport is only shown in selected channels 44, 48, or portions thereof. Like fluid transport occurs throughout the channels 44, 48.)

Accordingly, an oil supply from the outer radius 18 to the channels 48 requires a greater fluid pressure than an oil supply from the inner radius 14 to the channels 48. A relatively greater fluid pressure leads to better shudder resistance (i.e., greater $E_2$ as described above) while a relatively lower fluid pressure leads to greater damping properties in the normal direction (i.e., lower $E_1$). The size and number of channels 44, 48 also affects the required fluid pressure to affect fluid flow through the channels, as will be readily understood to those skilled in the art. Thus, the selected size and number of the channels 44, 48, as well as the choice of supplying fluid from the inner vs. the outer radius 14, 18, respectively, allows for an optimized, dual-directional moduli of elasticity in the friction member 10.

It is desirable to establish a relatively high modulus of elasticity $E_2$ in the second direction (i.e., the radial direction) to minimize shudder, as discussed above. (Preferably, the modulus of elasticity $E_2$ is greater than the modulus of elasticity E of the friction member 10 formed without the channels 48.) However, it is desirable to keep the stiffness, or modulus of elasticity $E_1$ in the normal direction low, as discussed above, to maximize the coefficient of friction u. Accordingly, the first and second channels 44, 48 must be designed in appropriate size and number to accomplish the goals of low $E_1$, high $E_2$ (i.e., dual-directional moduli of elasticity) and adequate porosity to provide cooling circulation of the oil at the actual contact area 38. Preferably, the channels 44 and 48, although likely deformed, remain open even under clutch pressure, such that the cooling function is accomplished.

Referring to FIG. 2A, the friction member 110 is composed of a first material 122 and a second material 119. The first material 122 consists of generally elongated strands (i.e., first strands). The first material 122 may be fibers of poly-paraphenylene terephthalamide, marketed by DuPont under the trademark KEVLAR®. The friction member 110 further includes a second material 119. The second material 119 consists of second strands 138. The second strands 138 are woven with the first strands 124. The second material 119 may be carbon-based fibers woven to form the second strands 138. The woven friction member 110 is permeable to lubricant via crevices or channels formed by the woven pattern. The friction member 110 forms channels 144 between woven first strands 124 and second strands 138 and disposed substantially normal to the direction of slide (denoted by arrow "S" in FIG. 2C). The channels 144 are disposed similarly to channels 44 shown in FIG. 1. Additionally, the woven friction member 110 forms second channels 148 running parallel to the direction of slide shown in FIG. 2C. The second channels 148 are disposed similarly to second channels 48 of FIG. 1. For the purpose of understanding such lubricant transport, the friction member 110 may be viewed as a reticulated, screen-like formation. The reticulations would thus form sufficient open spaces in one direction to form normal channels 144 cross-wise through the reticulated formation, as well as sufficient open spaces meandering substantially along the plane of the reticulated formation to form channels 148 substantially parallel to the direction of slide.

FIG. 2B shows another view of first channels 144 formed between the woven first material 122 and second material 119. Referring to FIG. 2C, the friction member 110 is adhered or otherwise attached to an upper surface 131 of a clutch member 117. An opposing reaction member 126 is disposed opposite the clutch member 117 such that the friction member 110 is between the clutch member 117 and reaction member 126. The friction surface 130 contacts the reaction member 126 when the reaction member 126 and clutch member 117 move together under clutch pressure. Thus, sliding contact occurs at the friction surface 130. As may be viewed in FIG. 2C, the first and second strands 124, 138, respectively, are woven such that friction surface 130 is formed only by the second strands 138. Thus, the sliding contact occurs with the second strands 138 and not with the first strands 124. The second strands 138 have a second modulus of elasticity that is higher than a first modulus of elasticity of the first strands 124. Accordingly, the friction member 110 will be compliant with the reaction member 126 to enable a high coefficient of friction and yet will be less compliant in the direction of slide, thus helping to reduce vibrational shudder.

Referring to FIG. 3A, a first material 222 is disposed about on exterior surface 220 of a second material 219 to form a composite strand 224. The second material 219 may be strands or fibers of poly-paraphenylene terephthalamide, marketed by DuPont under the trademark KEVLAR®, or a material having similar properties. The first material 222 may be a resin 213 disposed about the exterior surface 220 of the second material 219. A friction surface 230 is formed by the friction member 210.

Referring to FIG. 3B, a plurality of composite strands 224 are woven to form a friction member 210 having the friction surface 230. The direction of slide is across the exposed friction surface 230. The woven friction member 210 forms first channels 244 between individual strands 224 running substantially normal to the friction surface 230, as well as second channels 248 running substantially parallel to the friction surface 230 also between individual strands 224. The channels 244 and 248 are arranged similarly to channels 44 and 48 shown in FIG. 1.

As set forth in the claims, various features shown and described with the different embodiments of the invention may be combined.

While the best modes for carrying out the invention have been described in detail, those familiar with the art to which this invention relates will recognize various alternative designs and embodiments for practicing the invention within the scope of the appended claims.

The invention claimed is:

1. A friction member for engagement in a torque-transmitting mechanism, said friction member comprising:
 a first material;
 a second material;
 wherein said first and second materials are woven together to provide a friction surface, the friction member being characterized by a first modulus of elasticity in a first direction with respect to said friction surface and a second modulus of elasticity in a second direction with respect to said friction surface; and wherein said second modulus of elasticity is greater than said first modulus of elasticity.

2. The friction member of claim 1, wherein said friction surface is operable for sliding contact with an opposing reaction member in the torque-transmitting mechanism, wherein said sliding contact is characterized by a coefficient of friction;
 wherein said first direction is substantially normal to said sliding contact, wherein said second direction is substantially parallel to said sliding contact; and
 wherein said first and second moduli of elasticity cooperate to at least partially establish said coefficient of friction and control vibrational shudder of the torque-transmitting mechanism resulting from said sliding contact.

3. The friction member of claim 2, wherein said woven friction member forms first and second channels operable for transporting lubricant through the friction member in substantially said first and second directions, respectively;
 wherein the friction member is characterized by an inner diameter and an outer diameter; and
 wherein said first and second channels are operable for transporting lubricant from one of said inner diameter and said outer diameter.

4. The friction member of claim 1, wherein said woven friction member forms channels disposed in said first direction for transporting lubricant through the friction member in said first direction, said first modulus of elasticity being at least partially affected by lubricant transport through said channels to thereby at least partially increase said coefficient of friction.

5. The friction member of claim 1, wherein said woven friction member forms channels disposed in said second direction for transporting lubricant through the friction member in said second direction, said second modulus of elasticity being at least partially affected by lubricant transport through said channels to thereby at least partially decrease vibrational shudder of the torque-transmitting mechanism.

6. The friction member of claim 1, wherein said first and second materials are woven such that said friction surface is substantially formed by said second material; and wherein said first material is disposed substantially away from said friction surface.

7. The friction material of claim 6, wherein said friction surface is operable for sliding contact with an opposing reaction member; wherein said first material is characterized by generally elongated first strands; wherein said first strands are disposed generally parallel to one another and to said sliding contact; and wherein said second material is characterized by generally elongated second strands, said second strands being woven with said first strands such that said second strands form said friction surface, said friction surface being disposed between the reaction member and said first strands such that said sliding contact occurs with said second strands.

8. The friction member of claim 1, wherein said first material includes fibers comprising poly-paraphenylene terephthalamide.

9. The friction member of claim 1, wherein said second material includes carbon-based fibers.

10. The friction member of claim 9, wherein said first material includes a coating adhered to said second material.

11. The friction member of claim 10, wherein said first material is a resin.

12. A power transmission comprising:
a torque-transmitting mechanism including:
a friction member;
an opposing reaction member, said friction member and reaction member being selectively engageable for transmitting power;
said friction member having a friction surface for sliding contact with said reaction member, wherein said sliding contact is characterized by a coefficient of friction, said sliding contact acting to engage said torque-transmitting mechanism;
said friction member having: a first material; and a second material; wherein said first and second material are woven, said friction material being characterized by a first modulus of elasticity in a first direction with respect to said sliding contact and a second modulus of elasticity in a second direction with respect to said sliding contact; and wherein said second modulus of elasticity is greater than said first modulus of elasticity.

13. The power transmission of claim 12, wherein said first and second moduli of elasticity cooperate to at least partially establish said coefficient of friction and control vibrational shudder of said torque-transmitting mechanism resulting from said sliding contact.

14. The power transmission of claim 13, wherein said woven first and second materials form first and second channels operable for transporting lubricant through said friction member in substantially said first and second directions, respectively;
wherein said friction member is characterized by an inner diameter and an outer diameter; and
wherein said channels are operable for transporting lubricant from one of said inner diameter and said outer diameter.

15. The power transmission of claim 13, wherein said first and second materials are woven such that said friction surface is substantially formed by said second material; and wherein said first material is disposed substantially away from said friction surface.

16. The power transmission of claim 13, wherein said first material is characterized by generally elongated first strands; wherein said first strands are disposed generally parallel to one another and to said sliding contact; and wherein said second material is characterized by generally elongated second strands, said second strands being woven with said first strands such that said second strands form said friction surface, said friction surface being disposed between said reaction member and said first strands such that said sliding contact occurs with said second strands.

17. The power transmission of claim 16, wherein said first material includes fibers at least partially composed of poly-paraphenylene terephthalamide and said second material includes carbon-based fibers.

18. The power transmission of claim 13, wherein said second material includes woven carbon-based fibers; and
wherein said first material includes a resin coating adhered to said second material.

19. The power transmission of claim 12, wherein said first direction is substantially normal to said sliding contact; and wherein said second direction is substantially parallel to said sliding contact.

20. A friction member for engagement in a torque-transmitting mechanism, the friction member comprising:
a first material; and a second material; wherein said first and second materials are woven together to provide a friction surface, the friction member being characterized by a first modulus of elasticity in a first direction with respect to said friction surface and a second modulus of elasticity in a second direction with respect to said friction surface, wherein said second modulus of elasticity is greater than said first modulus of elasticity;
wherein the woven friction member forms channels disposed in said first direction for transporting lubricant through the friction member in said first direction, said first modulus of elasticity being at least partially affected by lubricant transport through said channels to thereby at least partially increase said coefficient of friction;
wherein the woven friction member forms channels disposed in said second direction for transporting lubricant through the friction member in said second direction, said second modulus of elasticity being at least partially affected by lubricant transport through said channels to thereby at least partially decrease vibrational shudder of the torque-transmitting mechanism;
wherein said first and second materials are woven such that said friction surface is substantially formed by said second material; wherein said first material is disposed substantially away from said friction surface; wherein said first material includes fibers at least partially composed of poly-paraphenylene terephthalamide; and wherein said second material includes carbon-based fibers.

* * * * *